(No Model.) 2 Sheets—Sheet 1.
R. WEBER.
DOUBLE MOLD BOARD PLOW.
No. 417,892. Patented Dec. 24, 1889.
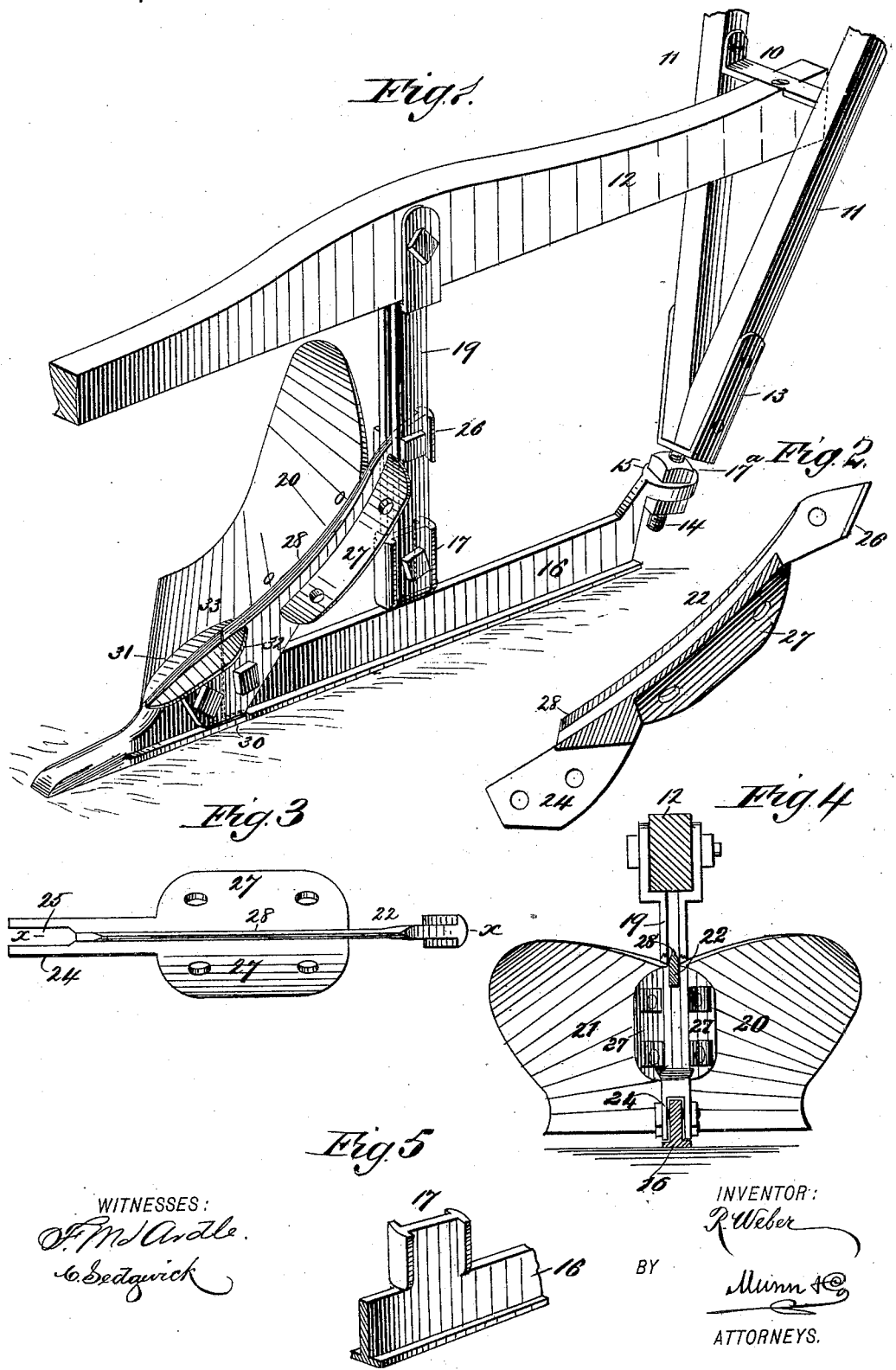

(No Model.) 2 Sheets—Sheet 2.

R. WEBER.
DOUBLE MOLD BOARD PLOW.

No. 417,892. Patented Dec. 24, 1889.

WITNESSES:
F. McArdle
C. Sedgwick

INVENTOR:
R. Weber
BY Munn & Co.
ATTORNEYS.

UNITED STATES PATENT OFFICE.

ROBERT WEBER, OF SEALY, TEXAS.

DOUBLE-MOLD-BOARD PLOW.

SPECIFICATION forming part of Letters Patent No. 417,892, dated December 24, 1889.

Application filed October 3, 1889. Serial No. 325,871. (No model.)

*To all whom it may concern:*

Be it known that I, ROBERT WEBER, of Sealy, in the county of Austin and State of Texas, have invented a new and useful Improvement in Double-Mold-Board Plows, of which the following is a full, clear, and exact description.

My invention relates to an improvement in double-mold-board plows, and has for its object to provide a plow of simple and durable construction, capable of easy manipulation, and wherein the point may be expeditiously removed or replaced when necessary.

A further object of the invention is to provide a means whereby the plow-beam may be raised or lowered at will.

The invention consists in the novel construction and combination of the several parts, as will be hereinafter more fully set forth, and pointed out in the claims.

Reference is to be had to the accompanying drawings, forming a part of this specification, in which similar figures of reference indicate corresponding parts in all the views.

Figure 6:
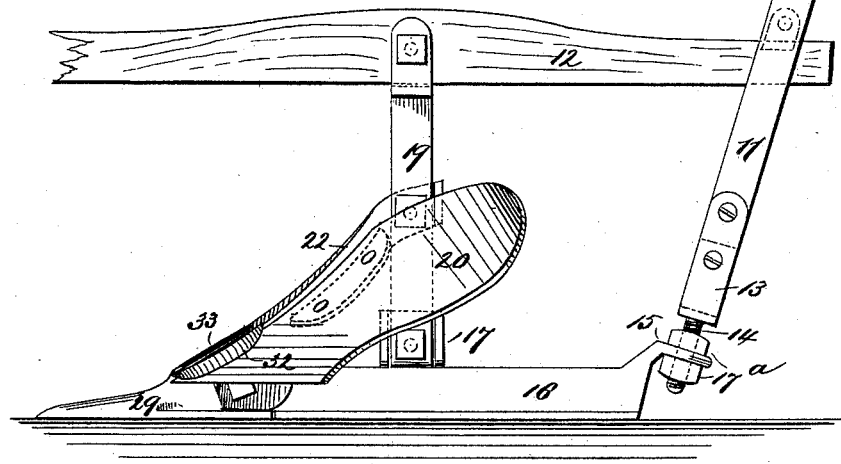
Figure 7:
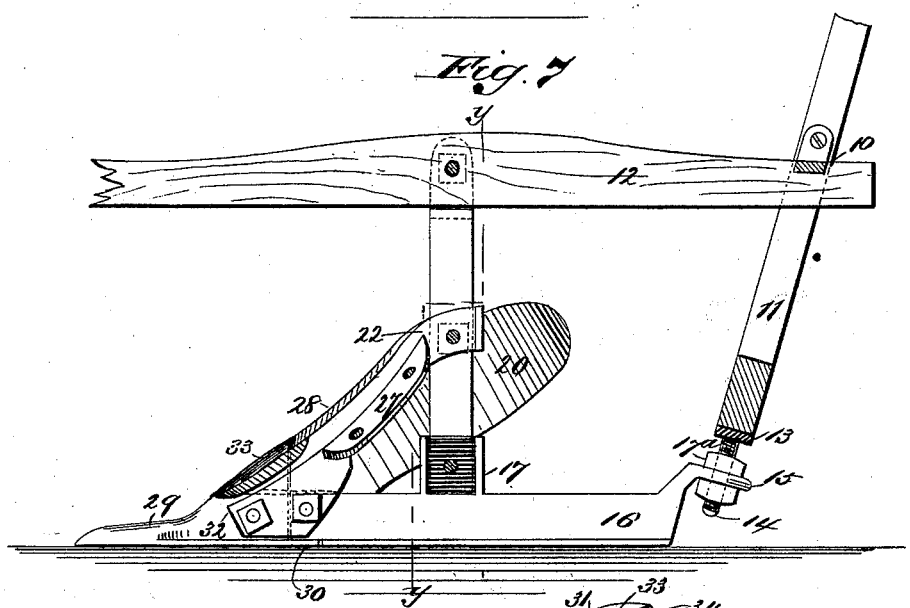
Figure 8:
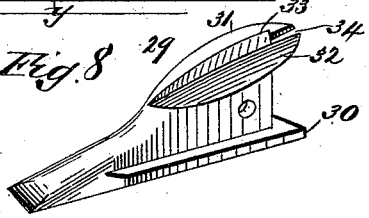

Figure 1 is a perspective view of the plow with one mold-board removed. Fig. 2 is a central longitudinal section through the body of the plowshare, taken on line $xx$ of Fig. 3. Fig. 3 is a plan view of the said body. Fig. 4 is a section on line $yy$ of Fig. 7. Fig. 5 is a partial perspective view of the runner or bar. Fig. 6 is a side elevation of the plow. Fig. 7 is a side elevation with one mold-board removed, and Fig. 8 is a perspective view of the point detached.

In carrying out the invention the connecting-bar 10 of the handles 11 is secured to the upper face of the plow-beam 12 at or near its rear extremity, the said handles being carried downward below the beam in such manner that their lower ends will meet, forming, essentially, a V, as illustrated in Fig. 1. The lower ends of the handles are rigidly bolted together, preferably being inclosed by a socket 13, and from the under face of said socket a screw 14 is downwardly projected, which screw is made to pass through an extension 15, integral with the rear end of the share bar or runner 16. The handles are attached to the runner by lock-nuts 17$^a$, placed upon the screw 14, one above and the other below the said extension 15. At or or near the center of the bar or runner 16 an upwardly-extending perpendicular arm 17 is formed, (illustrated in detail in Fig. 5,) which arm is provided with side flanges.

The bar 16 is connected with the beam 12 immediately above it through the medium of a standard 19. This standard consists of two parallel plates, which fit at their lower ends against the sides of the arm 17 between the flanges, and are rigidly bolted to said arm. The upper ends of the plates are bent outwardly and upwardly to receive the lower portion of the plow-beam 12 and clamp the sides thereof, and the upper portion of the standard 19 is pivotally attached to the plow-beam by means of a suitable pivot pin or bolt. It will thus be observed that the forward end of the plow-beam may be readily raised or lowered to cause the plow to travel deep or shallow in the soil by manipulating the lock-nuts 17$^a$ upon the screw 14 of the handle. As the handles are raised, the forward end of the plow-beam is depressed, and vice versa.

The plowshare comprises two mold-boards 20 and 21 and a body-bar or backbone 22, the latter being illustrated in Figs. 2 and 3. The backbone or body-bar is slightly concaved upon its upper face, the lower end being carried downward and slotted, as illustrated at 25 in Fig. 3, to form opposing ears 24. The upper end of the body-bar is flattened and carried slightly rearward to extend between the plates of the standard 19, and the rear extremity of the said body-bar is provided with a head 26, adapted to contact with the rear edge of the standard, as best shown in Fig. 1. The body-bar is attached to the standard by a suitable bolt being passed through apertures in the plates constituting the standard and through a suitable opening in the rear extension of the bar.

Between the ends of the body-bar 22, at each side, essentially horizontal wings 27 are formed, of sufficient length to extend from the forward edge of the standard to the commencement of the ears 24, and the said wings are preferably given a slight downward inclination, and are provided with apertures for the reception of bolts. Upon the said wings 27 the mold-boards 20 and 21, which may be of any approved construction, are secured by passing suitable nutted bolts through the mold-boards and the apertures of the wings.

Upon the upper face of the body-bar 22, at the center, a longitudinal rib 28 is formed, essentially V-shaped in cross-section, presenting a sharpened upper edge, and the mold-boards 20 and 21 lie at each side of this rib, the object of the rib being to render plowing easy and to divide the middle of the furrow correctly. In fact, the said rib acts in the capacity of a colter.

The point 29 is attached to the body-bar and to the share-bar 16. The point is constructed as illustrated in Fig. 8, being provided with a bottom flange or running surface 30, which is in horizontal alignment or in the same plane with the equivalent surface of the share bar or runner 16. The upper edge of the point is inclined, and upon the rear portion of the upper edge two downwardly-inclined wings 31 and 32 are formed, which wings are separated by a sharp rib 33, adapted to form a continuation of the rib 28 of the body-bar when the point is attached thereto. The rib 33 does not extend to the rear end of the wings 31 and 32, the said wings at their upper rear end being provided with a slot 34, whereby when the point is attached to the share-bar 16 and body-bar 22 the wings 31 and 32 will clamp the sides of the rib 28 of the body-bar, and thereby assist in holding the point in a fixed position. The wings serve to hold or bind the mold-boards in place, as the upper faces of the mold-boards contact with the under faces of the wings, as illustrated in Figs. 1, 6, and 7.

In attaching the point to the plow the rear end of the point is slid in the slot 25 of the body-bar 22 until the rib 33 of the point contacts with the rib 28 of the body-bar, and the wings 31 and 32 contact with the upper faces of the mold-boards. A suitable bolt is then passed through the lower extremities of the ears 24 of the body-bar, and through the rear body portion of the point, as illustrated in Fig. 1. The body-bar 22 is rigidly attached to the share-bar by passing a similar bolt through the ears of the body-bar and through the share-bar, as also illustrated in Fig. 1. To further guard against the movement of the point when fixed to the plow, the lower flange portion of the share-bar 16 is cut away at the forward end, and the equivalent flange portion of the point is made to extend beyond the rear end of the point-body, as illustrated at 30 in Fig. 8, whereby the point and the share-bar are connected at the bottom by a lap-joint, as best shown in Fig. 7.

Having thus described my invention, I claim as new and desire to secure by Letters Patent—

1. In a plow, the combination, with the share-bar, a standard attached to the said bar, and a beam pivoted upon said standard, of handles adjustably attached to the share-bar and rigidly secured to the beam, substantially as shown and described.

2. In a plow, the combination, with the share-bar, a point detachably attached thereto, a standard secured to the said share-bar, and a plow-beam pivoted upon said standard, of handles rigidly secured to the plow-beam, a screw attached to the bottom of the handles adapted to pass through an extension of the share-bar, and lock-nuts located upon said screw contacting with the extension of the share-bar, substantially as shown and described.

3. In a plow, the combination, with the share-bar, the beam, and a standard uniting the said share bar and beam, of a share consisting of a body-bar provided with side wings and a central longitudinal sharpened rib, and a mold-board attached to each of the said wings, substantially as shown and described.

4. In a plow, the combination, with a share-bar, the beam, a standard connecting the bar and the beam, and a share consisting of a body-bar provided with side wings and a central longitudinal sharpened rib, and a mold-board attached to each of said wings, of a point attached to the body of the share and the bar of the plow, the said point being provided with wings at each side of its upper rear surface, and a central longitudinal sharpened rib adapted to constitute a continuation of the rib of the share, substantially as and for the purpose specified.

ROBERT WEBER.

Witnesses:
J. G. KELLNA,
F. PETERS.